No. 645,825. Patented Mar. 20, 1900.
J. NASH.
LEVELING ATTACHMENT FOR VEHICLES.
(Application filed Aug. 25, 1899.)
(No Model.)
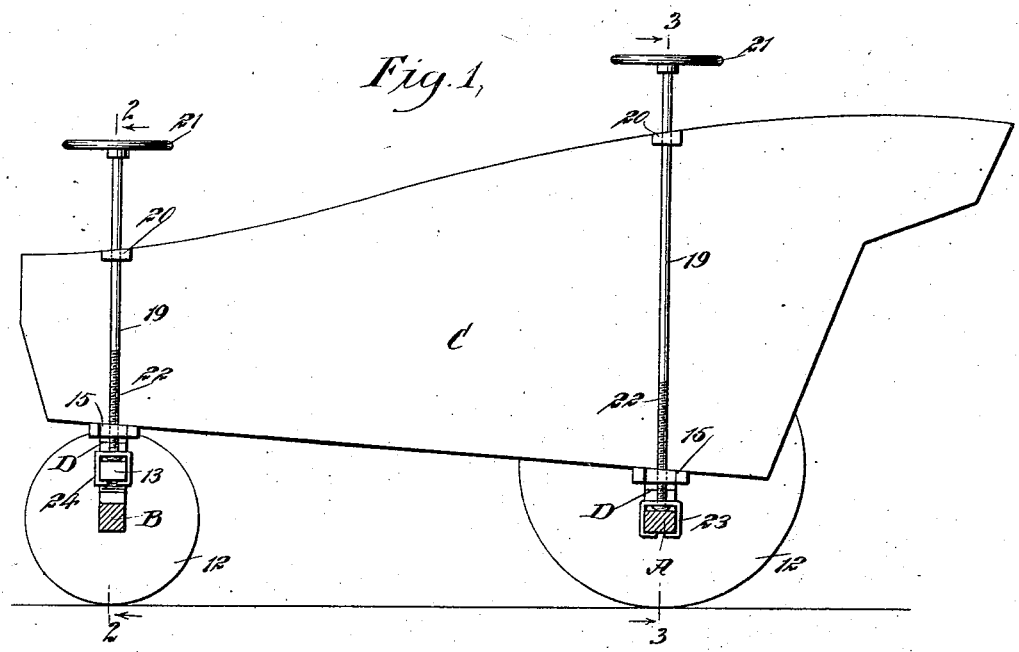
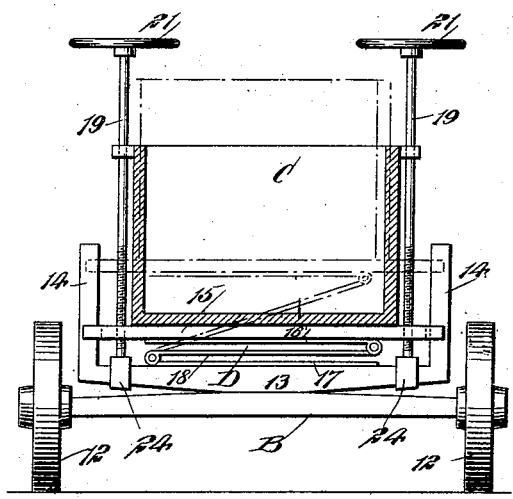
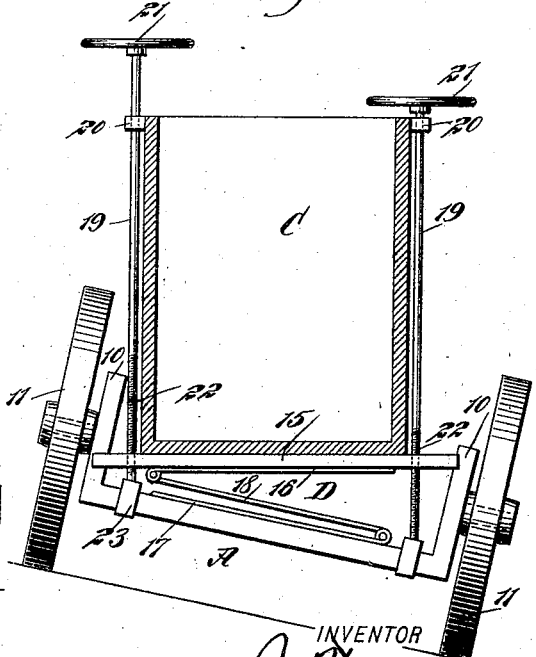
WITNESSES: Edward Thorpe
INVENTOR J. Nash
ATTORNEYS

UNITED STATES PATENT OFFICE.

JOHN NASH, OF DAYTON, WASHINGTON.

LEVELING ATTACHMENT FOR VEHICLES.

SPECIFICATION forming part of Letters Patent No. 645,825, dated March 20, 1900.

Application filed August 25, 1899. Serial No. 728,468. (No model.)

*To all whom it may concern:*

Be it known that I, JOHN NASH, of Dayton, in the county of Columbia and State of Washington, have invented a new and Improved Leveling Attachment for Vehicles, of which the following is a full, clear, and exact description.

The object of the invention is to provide a means of attachment between the body of a vehicle, especially that of a threshing-machine, and its axles, so that the body of the vehicle may be adjusted to a level position when operating upon a hillside or where the ground is out of level, thus preventing the machine from capsizing and obviating the labor of digging pits for the wheels to level the body.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a side elevation of the body of the machine and a section through the axles thereof. Fig. 2 is a transverse vertical section taken substantially on the line 2 2 of Fig. 1, the vehicle being represented as upon a level surface; and Fig. 3 is a transverse vertical section taken substantially on the line 3 3 of Fig. 1, the vehicle being represented as upon an inclined surface.

The rear axle A is provided at each end with an unwardly-extending standard 10, and the rear ground-wheels 11 are mounted to turn on spindles carried by said standards. Under this construction of axle the main body of the axle may be made quite low, and yet very large wheels be used in connection therewith.

The forward axle B is practically straight and carries smaller ground-wheels 12 at each of its ends, while a bolster 13 is pivoted on the axle B, and said bolster is provided with upwardly-extending standards 14 at its ends. The body C of the vehicle may be of any desired construction or formation; but an adjusting-bar 15 is provided for said body at each of its ends, the bars being securely fastened to the bottom of the body, extending beyond its sides, as shown in Figs. 2 and 3.

These bars are practically a portion of the body. The adjusting-bars 15 are bifurcated at their outer ends, so that the rear bars 15 may straddle the rear standards 10 and be guided thereby and the forward bar straddle the standards 14 of the bolster. A hinged connection D is provided between the rear adjusting-bar 15 and the body of the rear axle A, and a similar hinged connection is provided between the bolster 13 and the forward adjusting-bar 15. Each hinge usually comprises three leaves—an upper leaf 16, a lower leaf 17, and an intermediate leaf 18— the knuckle connection between the leaves being at the ends of the intermediate leaf 18. Thus it will be observed that the body of the vehicle may be raised to any desired height parallel with the axles, as shown in dotted lines in Fig. 2, or the said body may be inclined toward either side at an angle to the axles, as is shown in positive lines in Fig. 3.

The movement of the body is accomplished, preferably, through the medium of adjusting-screws 19, two of which are located at each end of the body, one at each side, and each adjusting-screw 19 is passed loosely through an upper guide 20 and is provided at its upper end with a hand-wheel 21, while the lower portion of each adjusting-screw 19 is provided with an exteriorly-threaded surface 22, and said threaded surface is passed through bars fitted in the adjusting-bars 15 or through threaded apertures made directly in said bars.

The lower ends of the rear adjusting-screws 19 are loosely mounted in clamps 23, secured upon the body of the rear axle A, while the lower ends of the forward adjusting-screws 19 are similarly mounted in clamps 24, secured to the bolster 13, as shown in Fig. 2.

It is evident that by turning the screws equally at each side the body of the vehicle will be raised parallel with the axle and that by manipulating the screws on one side of the machine that side may be elevated until the body is straight or level, no matter at what inclination the axles may stand.

Having thus described my invention, I claim as new and desire to secure by Letters Patent—

1. In a vehicle, the combination with the running-gear and body, of a hinge-section pivoted at one end to the running-gear and at the other end to a portion on the body, and adjusting devices at each side of the body, substantially as specified.

2. In a vehicle, the combination with the running-gear and the body, of a bolster on the running-gear, standards at the ends of the bolster, an adjusting-bar having sliding connection with the standards, a hinge-section connected at one end to the bolster and at the other end to the adjusting-bar, and screws for moving the body relatively to the running-gear, substantially as specified.

3. In a vehicle, a body, a cranked axle, an adjusting-bar connected to the body and having sliding connection with the upright portions of the axle, a hinge-section between the axle and bar, and screws for adjusting the body relatively to the axle, substantially as specified.

JOHN NASH.

Witnesses:
GEO. B. BAKER,
EDNA B. HOLMES.